United States Patent
Davis et al.

(10) Patent No.: US 10,242,415 B2
(45) Date of Patent: Mar. 26, 2019

(54) METHOD AND SYSTEM FOR DETERMINING CONTENT TREATMENT

(71) Applicants: Bruce L Davis, Lake Oswego, OR (US); William Y Conwell, Portland, OR (US)

(72) Inventors: Bruce L Davis, Lake Oswego, OR (US); William Y Conwell, Portland, OR (US)

(73) Assignee: Digimarc Corporation, Beaverton, OR (US)

(*) Notice: Subject to any disclaimer, the term of this patent is extended or adjusted under 35 U.S.C. 154(b) by 1 day.

(21) Appl. No.: 13/686,541

(22) Filed: Nov. 27, 2012

(65) Prior Publication Data

US 2013/0085825 A1    Apr. 4, 2013

Related U.S. Application Data

(60) Continuation-in-part of application No. 12/048,072, filed on Mar. 13, 2008, which is a
(Continued)

(51) Int. Cl.
*G06Q 20/00* (2012.01)
*G06Q 50/18* (2012.01)
(Continued)

(52) U.S. Cl.
CPC ........... *G06Q 50/184* (2013.01); *G06Q 10/06* (2013.01); *G06Q 10/10* (2013.01); *G06Q 20/08* (2013.01);
(Continued)

(58) Field of Classification Search
CPC .................................................. G06Q 50/183
See application file for complete search history.

(56) References Cited

U.S. PATENT DOCUMENTS

| 5,210,820 A | 5/1993 | Kenyon |
| 5,715,403 A | 2/1998 | Stefik |

(Continued)

FOREIGN PATENT DOCUMENTS

| WO | WO02/065782 | 8/2002 |
| WO | WO2002065782 | 8/2002 |
| WO | WO09/042899 | 4/2009 |

OTHER PUBLICATIONS

Covell et al, U.S. Appl. No. 60/957,446, filed Aug. 22, 2007, entitled "Fast and Accurate Detection and Classification of Matches Between Time-Based Media" (which serves as a priority application for US published application 20090052784).
(Continued)

*Primary Examiner* — Neha Patel
*Assistant Examiner* — Tim B Hale
(74) *Attorney, Agent, or Firm* — Digimarc Corporation

(57) ABSTRACT

Content uploaded to a video distribution service is analyzed to determine if a portion matches part of any reference work. If a match is found, treatment of the uploaded content is determined based on stored rule data, and based on one or more factors. These factors can include, e.g., the length of the matching portion, the part of the reference work from which the matching portion was apparently copied, the confidence of the match, the popularity of the uploaded content (or of the reference work), the geography from which the content was uploaded (or the geography to which it is to be downloaded), etc. Further determinations may be made by human evaluators (including crowd-source approaches). A great variety of other features and arrangements are also detailed.

4 Claims, 3 Drawing Sheets

Related U.S. Application Data continuation-in-part of application No. 12/114,612, filed on May 2, 2008, now Pat. No. 8,341,412, which is a division of application No. 11/613,891, filed on Dec. 20, 2006, now abandoned.

(60) Provisional application No. 60/894,859, filed on Mar. 14, 2007.

(51) Int. Cl.
*G06Q 20/08* (2012.01)
*G06Q 20/22* (2012.01)
*G06Q 10/06* (2012.01)
*G06Q 30/06* (2012.01)
*H04N 21/8352* (2011.01)
*H04N 21/8355* (2011.01)
*H04N 21/8358* (2011.01)
*H04N 21/8405* (2011.01)
*G06Q 10/10* (2012.01)
*G06Q 50/00* (2012.01)

(52) U.S. Cl.
CPC ............. *G06Q 20/22* (2013.01); *G06Q 30/06* (2013.01); *G06Q 50/01* (2013.01); *G06Q 50/18* (2013.01); *H04N 21/8352* (2013.01); *H04N 21/8355* (2013.01); *H04N 21/8358* (2013.01); *H04N 21/8405* (2013.01)

(56) References Cited

U.S. PATENT DOCUMENTS

| | | |
|---|---|---|
| 5,765,152 A | 6/1998 | Erickson |
| 5,983,351 A | 11/1999 | Glogau |
| 6,055,538 A | 4/2000 | Kessenich et al. |
| 6,081,788 A | 6/2000 | Appleman et al. |
| 6,122,403 A | 9/2000 | Rhoads |
| 6,251,016 B1 | 6/2001 | Tsuda et al. |
| 6,401,118 B1 | 6/2002 | Thomas |
| 6,493,744 B1 | 12/2002 | Emens et al. |
| 6,546,135 B1 | 4/2003 | Lin et al. |
| 6,603,921 B1 | 8/2003 | Kanevsky et al. |
| 6,647,548 B1 | 11/2003 | Lu |
| 6,684,254 B1 | 1/2004 | Dutta |
| 6,807,634 B1 | 10/2004 | Braudaway et al. |
| 6,947,571 B1 | 9/2005 | Rhoads et al. |
| 6,948,657 B2 | 9/2005 | Sugino et al. |
| 6,952,769 B1 | 10/2005 | Dubey |
| 6,990,453 B2 | 1/2006 | Wang et al. |
| 7,043,473 B1 | 5/2006 | Rassool et al. |
| 7,047,241 B1 | 5/2006 | Erickson |
| 7,117,513 B2 | 10/2006 | Nelson |
| 7,120,273 B2 | 10/2006 | Robins et al. |
| 7,159,116 B2 | 1/2007 | Moskowitz |
| 7,185,201 B2 | 2/2007 | Rhoads |
| 7,284,255 B1 | 10/2007 | Apel et al. |
| 7,298,864 B2 | 11/2007 | Jones |
| 7,302,574 B2 | 11/2007 | Conwell |
| 7,346,605 B1 | 3/2008 | Hepworth et al. |
| 7,363,278 B2 | 4/2008 | Schmelzer |
| 7,379,214 B2 | 5/2008 | Matsumoto |
| 7,369,677 B2 | 6/2008 | Petrovic et al. |
| 7,444,403 B1 | 10/2008 | Packer et al. |
| 7,681,032 B2 | 3/2010 | Peled et al. |
| 7,689,532 B1 | 3/2010 | Levy |
| 7,702,591 B2 | 4/2010 | Nuttall et al. |
| 7,783,489 B2 | 8/2010 | Kenyon et al. |
| 7,831,531 B1 | 11/2010 | Baluja et al. |
| 7,870,574 B2 | 1/2011 | Kenyon et al. |
| 8,010,511 B2 | 8/2011 | Brock et al. |
| 8,490,206 B1 | 7/2013 | Fish |
| 2002/0002586 A1 | 1/2002 | Rafal et al. |
| 2002/0028000 A1 | 3/2002 | Conwell et al. |
| 2002/0048369 A1* | 4/2002 | Ginter et al. ............... 380/277 |
| 2002/0052849 A1 | 5/2002 | McCutchen et al. |
| 2002/0052885 A1 | 5/2002 | Levy |
| 2002/0078441 A1 | 6/2002 | Drake |
| 2002/0120925 A1 | 8/2002 | Logan |
| 2002/0168082 A1* | 11/2002 | Razdan ........................ 382/100 |
| 2002/0174132 A1 | 11/2002 | Silverman |
| 2003/0021441 A1 | 1/2003 | Levy |
| 2003/0037010 A1 | 2/2003 | Schmelzer |
| 2003/0061490 A1 | 3/2003 | Abajian |
| 2004/0009763 A1 | 1/2004 | Stone et al. |
| 2004/0010417 A1 | 1/2004 | Peled |
| 2004/0022444 A1* | 2/2004 | Rhoads ........................ 382/232 |
| 2004/0044571 A1 | 3/2004 | Bronnimann et al. |
| 2004/0054661 A1 | 3/2004 | Cheung |
| 2004/0078292 A1 | 4/2004 | Blumenau |
| 2004/0107166 A1* | 6/2004 | Stefik ...................... G06F 21/10 705/51 |
| 2004/0107348 A1 | 6/2004 | Iwamura |
| 2004/0163106 A1 | 8/2004 | Schrempp et al. |
| 2004/0225645 A1 | 11/2004 | Rowney et al. |
| 2004/0230529 A1 | 11/2004 | Tieu et al. |
| 2004/0236828 A1 | 11/2004 | Igeta |
| 2004/0243567 A1 | 12/2004 | Levy |
| 2005/0008225 A1 | 1/2005 | Yanagisawa et al. |
| 2005/0012563 A1 | 1/2005 | Kramer |
| 2005/0025335 A1* | 2/2005 | Bloom et al. ................. 382/100 |
| 2005/0043548 A1 | 2/2005 | Cates |
| 2005/0049868 A1* | 3/2005 | Busayapongchai ........... 704/251 |
| 2005/0105726 A1* | 5/2005 | Neubauer et al. ............ 380/201 |
| 2005/0125358 A1 | 6/2005 | Levin et al. |
| 2005/0141707 A1 | 6/2005 | Haitsma |
| 2005/0193016 A1 | 9/2005 | Seet et al. |
| 2005/0213790 A1 | 9/2005 | Rhoads et al. |
| 2005/0216417 A1 | 9/2005 | Risan et al. |
| 2005/0222900 A1 | 10/2005 | Fuloria et al. |
| 2005/0259819 A1 | 11/2005 | Oomen |
| 2005/0273617 A1 | 12/2005 | Mihcak et al. |
| 2005/0276570 A1 | 12/2005 | Reed et al. |
| 2005/0278787 A1 | 12/2005 | Naslund et al. |
| 2006/0029251 A1 | 2/2006 | Maeda et al. |
| 2006/0031114 A1 | 2/2006 | Zommers |
| 2006/0041828 A1 | 2/2006 | King et al. |
| 2006/0041943 A1 | 2/2006 | Singer et al. |
| 2006/0058019 A1 | 3/2006 | Chan et al. |
| 2006/0059116 A1 | 3/2006 | Levi et al. |
| 2006/0059561 A1 | 3/2006 | Ronning et al. |
| 2006/0075237 A1 | 4/2006 | Seo |
| 2006/0080200 A1 | 4/2006 | Ashton et al. |
| 2006/0080703 A1 | 4/2006 | Compton |
| 2006/0095586 A1 | 5/2006 | Adelman et al. |
| 2006/0101069 A1 | 5/2006 | Bell et al. |
| 2006/0115108 A1 | 6/2006 | Rodriguez |
| 2006/0128470 A1 | 6/2006 | Willis et al. |
| 2006/0171474 A1 | 8/2006 | Ramaswamy |
| 2006/0191017 A1 | 8/2006 | Hieda |
| 2006/0212704 A1 | 9/2006 | Kirovski et al. |
| 2006/0218651 A1 | 9/2006 | Ginter et al. |
| 2006/0230358 A1* | 10/2006 | Sacher et al. ................. 715/781 |
| 2006/0240862 A1 | 10/2006 | Neven |
| 2006/0271512 A1 | 11/2006 | Burges |
| 2006/0272028 A1 | 11/2006 | Maes |
| 2006/0287916 A1 | 12/2006 | Star et al. |
| 2006/0287996 A1 | 12/2006 | Kender et al. |
| 2007/0005417 A1 | 1/2007 | Desikan et al. |
| 2007/0005979 A1 | 1/2007 | Ishii |
| 2007/0033419 A1 | 2/2007 | Kocher et al. |
| 2007/0038567 A1 | 2/2007 | Allaire et al. |
| 2007/0053306 A1 | 3/2007 | Stevens |
| 2007/0098172 A1 | 5/2007 | Levy et al. |
| 2007/0106551 A1 | 5/2007 | McGucken |
| 2007/0110010 A1 | 5/2007 | Kotola et al. |
| 2007/0118737 A1 | 5/2007 | Shimizu |
| 2007/0130117 A1 | 6/2007 | Lapstun et al. |
| 2007/0130126 A1 | 6/2007 | Lucovsky et al. |
| 2007/0130580 A1 | 6/2007 | Covell et al. |
| 2007/0157228 A1 | 7/2007 | Bayer et al. |
| 2007/0157252 A1 | 7/2007 | Perez |
| 2007/0162349 A1 | 7/2007 | Silver |
| 2007/0162761 A1 | 7/2007 | Davis |

(56) References Cited

U.S. PATENT DOCUMENTS

| | | |
|---|---|---|
| 2007/0175998 A1 | 8/2007 | Lev |
| 2007/0192352 A1 | 8/2007 | Levy |
| 2007/0198426 A1 | 8/2007 | Yates |
| 2007/0203891 A1 | 8/2007 | Solaro et al. |
| 2007/0208711 A1 | 9/2007 | Rhoads |
| 2007/0208715 A1 | 9/2007 | Muehlbauer |
| 2007/0220575 A1 | 9/2007 | Cooper et al. |
| 2007/0233556 A1 | 10/2007 | Koningstein |
| 2007/0242880 A1 | 10/2007 | Stebbings |
| 2007/0253594 A1 | 11/2007 | Lunt |
| 2007/0260520 A1 | 11/2007 | Jha et al. |
| 2007/0260671 A1 | 11/2007 | Harinstein et al. |
| 2007/0294173 A1 | 12/2007 | Levy et al. |
| 2008/0002854 A1 | 1/2008 | Tehranchi et al. |
| 2008/0004116 A1 | 1/2008 | Van Luchene et al. |
| 2008/0008348 A1 | 1/2008 | Metois et al. |
| 2008/0010373 A1 | 1/2008 | Tojo |
| 2008/0027931 A1 | 1/2008 | Lu |
| 2008/0051029 A1 | 2/2008 | Witteman |
| 2008/0059211 A1 | 3/2008 | Brock et al. |
| 2008/0059285 A1 | 3/2008 | Hamoui |
| 2008/0101604 A1 | 5/2008 | Kocher et al. |
| 2008/0109369 A1* | 5/2008 | Su et al. ............... 705/59 |
| 2008/0154401 A1 | 6/2008 | Wang |
| 2008/0155701 A1 | 6/2008 | Martinez et al. |
| 2008/0162449 A1 | 7/2008 | Chao-Yu et al. |
| 2008/0178302 A1 | 7/2008 | Brock et al. |
| 2008/0209502 A1 | 8/2008 | Seidel |
| 2008/0235795 A1 | 9/2008 | Ishikawa et al. |
| 2008/0275763 A1 | 11/2008 | Tran et al. |
| 2009/0006225 A1 | 1/2009 | Multerer et al. |
| 2009/0052784 A1* | 2/2009 | Covell ............ G06K 9/00758 382/209 |
| 2009/0106442 A1 | 4/2009 | Liu |
| 2009/0144325 A1 | 6/2009 | Chastagnol et al. |

OTHER PUBLICATIONS

Liu et al, U.S. Appl. No. 60/856,501, filed Nov. 3, 2006, entitled "Rights Management" (which serves as a priority application for published US application 20080109369).

Petrovic et al, U.S. Appl. No. 60/833,991, Jul. 28, 2006, entitled "Signal Continuity Assessment Using Embedded Watermarks" (which serves as a priority application for US published application for 20080002854).

Riya, Visual Search, Aug. 23, 2006, www.riya.com.

Riya, Visual Search, Riya Personal Search, Aug. 23, 2006, http://riva.com/index?btnSearch=30e6728ad8c4846e.

Global File Registry, Global File Registry :The economic, scalable, solution for removing infringing content on the internet, Aug. 23, 2006, www.globalfileregistry.com.

Marc, P2P File Sharing: Altnet Registry is About Money, Not Protection, Aug. 3, 2006, http://www.p2p-weblog.com/50226711/alnet_registry_is_about_money_not_protection_php.

DRM Watch, Guba Introduces Video Fingerprint Filtering, Jul. 27, 2006, http://www.drmwatch.com/article.php/3623091.

Popescu et al., Exposing Digital Forgeries by Detecting Duplicated Image Regions, Department of Computer Science, Dartmouth College, 2005.

Cheung et al., Efficient Video Similarity Measurement and Search, Department of Electrical Engineering and Computer Sciences, University of California, Berkeley, 2000.

Ke et al., Efficient Near-duplicate Detection and Sub-image Retrieval, Oct. 10-16, 2004.

Indyk et al., Locality-Preserving Hashing in Multidimensional Spaces, 1997.

Hoad et al., Methods for Identifying Versioned and Plagiarised Documents, 2003.

Fetterly et al., On the Evolution of Clusters of Near-Duplicate Web Pages, Oct. 2004.

Fetterly et al., Detecting Phrase-Level Duplication on the World Wide Web, Aug. 2005.

Nevin Heintze, Scalable Document Fingerprinting, Extended Abstract, 1995.

Udi Manber, Finding Similar Files in a Large File System, Department of Computer Science, The University of Arizona, Tucson Arizona, Oct. 1993.

BayTSP, Digital Tracking+ Security+ Protection, May 17, 2006 www.baytsp.com/solutions_faq_html.

iCopyright on copyright, Jun. 13,2006, pwww.datadepth.com/.

Cowboyneal, Slashdot, Microsoft Seeking to Patent Automatic Censorship, May 4, 2006.

Snocap, Services, Sell Your Music, Aug. 23, 2006 htto://www.snocap.com/sell/.

Numly Numbers, Web2.0+ Copyright—Copyright 2.0, Jun. 8, 2006 www.numly.com/numly/default.asp.

Email about the product "Sentinel", Nov. 14, 2006.

File wrapper of provisional U.S. Appl. No. 60/975,158, filed Sep. 25, 2007 (and a priority application for 20080109369).

Global File Registry, Technical White Paper, Draft 1-26, May 2006.

Manber, Finding Similar Files in a Large File System, Department of Computer Science, The University of Arizona, Tucson Arizona, Oct. 1993.

U.S. Appl. No. 60/927,940, filed May 3, 2007, which serves as priority application for 20080275763 to Google.

Prosecution excerpts from U.S. Appl. No. 12/048,072, filed Mar. 8, 2008, including applicant submissions dated Mar. 13, 2008, Sep. 14, 2010, Apr. 6, 2011, Jun. 14, 2012, Aug. 7, 2013, Sep. 19, 2013, Apr. 9, 2014, May 12, 2015, and Office papers dated Aug. 10, 2010, Dec. 13, 2010, Mar. 4, 2011, Jun. 24, 2011, Oct. 15, 2013, Feb. 12, 2015, Jul. 10, 2015.

\* cited by examiner

US 10,242,415 B2

METHOD AND SYSTEM FOR DETERMINING CONTENT TREATMENT

RELATED APPLICATION DATA

This application is a continuation-in-part of application Ser. No. 12/048,072, filed Mar. 13, 2008, and Ser. No. 12/114,612, filed May 2, 2008. Application Ser. No. 12/048,072 claims priority benefit from provisional application 60/894,859, filed Mar. 14, 2007. Application Ser. No. 12/114,612 application is a division of copending application Ser. No. 11/613,891, filed Dec. 20, 2006 (published as US20070162761).

The following specification is essentially that of application Ser. No. 12/048,072. Appended to the end of this specification, as an appendix, is the text of application Ser. No. 12/114,612. This latter application was originally incorporated-by-reference into the Ser. No. 12/048,072 application (via a reference to its parent publication US20070162761).

BACKGROUND AND SUMMARY

Web site operators sometimes receive DMCA "take down" notices from media companies, alleging that content hosted on their web sites is copyrighted and should not be distributed. There is a growing need for automated tools to help web site operators pro-actively identify such content and treat it in a manner that might avoid the need for take-down notices. This need perhaps is felt most acutely by so-called "social networking" sites, to which individual users upload audio, video and picture files—content that is sometimes original, and sometimes not (and sometimes a combination).

Various techniques can be employed to automatically identify copyrighted content. One is to examine content data for a digital watermark embedded by the content owner to signal that the content is copyrighted and should not be reproduced. Such techniques are detailed, for example, in commonly-owned application Ser. No. 09/620,019, filed Jul. 20, 2000 (now U.S. Pat. No. 7,689,532), and patent publication US20020052885.

Another approach is to try and identify the content by pattern recognition techniques (sometimes termed "fingerprinting" or "robust hashing"). Once the content is identified, a metadata database can be consulted to determine whether distribution of the content should be allowed or prohibited. (Such techniques are detailed, e.g., in Haitsma, et al, "A Highly Robust Audio Fingerprinting System," Proc. Intl Conf on Music Information Retrieval, 2002; Cano et al, "A Review of Audio Fingerprinting," Journal of VLSI Signal Processing, 41, 271, 272, 2005; Kalker et al, "Robust Identification of Audio Using Watermarking and Fingerprinting," in Multimedia Security Handbook, CRC Press, 2005, and in patent documents WO02/065782, US20060075237, US20050259819, US20050141707, and US20020028000.)

Other techniques and systems related to the technology detailed herein are disclosed in patent publications US20080051029, US20080059211, US20080027931, US20070253594, US20070242880, US20070220575, US20070208711, US20070175998, US20070162761, US20060240862, US20040243567, US20030021441, U.S. Pat. Nos. 7,185,201, 7,298,864 and 7,302,574, and in provisional application 61/016,321, filed Dec. 21, 2007.

Part of the difficulty is that some of the content uploaded to web sites may include copyrighted material, yet qualify as "fair use"—such as parody, or commentary/criticism. ("Tolerated use" is a stepchild of fair use, and encompasses arguably infringing uses that are commonly overlooked by rights holders for reasons such as concern about adverse publicity, or out of desire for the exposure that such use affords.) Existing automated techniques do not make provision for "fair use" (nor for "tolerated use"). Instead, known techniques typically flag as objectionable any content that is determined to include any copyrighted material.

Described below is an illustrative arrangement that allows a more nuanced assessment of content data—one that responds differently, depending on context, environmental factors, and/or other circumstances.

DETAILED DESCRIPTION

Figure 1:
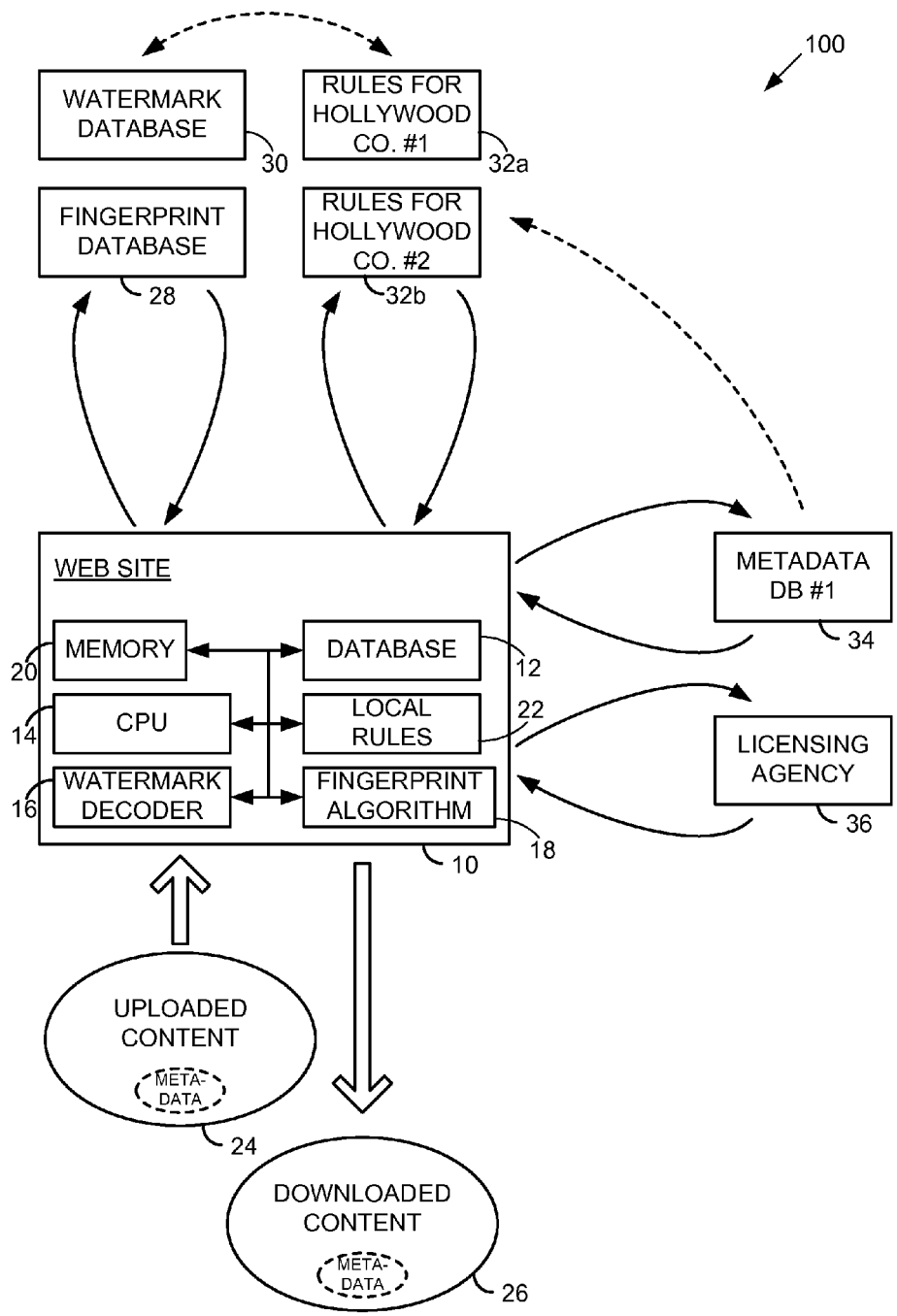
FIG. 1 shows an illustrative system employing some of the technology detailed herein.

Consider an embodiment that examines uploaded content (e.g., a video uploaded to MySpace, or YouTube), to identify portion(s) that have been derived from one or more pre-existing (reference) works. Using a technique such as fingerprinting, or digital watermark decoding, such a process may automatically determine that an uploaded video includes a ten second clip taken from the opening scene of the movie Dirty Harry, showing Clint Eastwood say, "Go ahead, make my day." The video may further include a government archive clip of Ronald Reagan, threatening to veto tax-increase legislation by using the same phrase, as well as a clip from the movie Back to the Future III, where Marty utters the same phrase. The video may also be found to include, as an underlying soundtrack, the entirety of the Eminem's song "Mosh."

Another example (long popular on YouTube) is the "Evolution of Dance" video, which shows Judson Laipply dancing briefly to excerpts of 30 popular songs (parenthetical times are where the song clip appears in the six minute video): "Hound Dog," by Elvis Presley (00.00-00.14); "The Twist," by Chubby Checker (00.14-00.31); "Stayin' Alive," by The Bee Gees (00.31-00.38); "Y.M.C.A.," by The Village People (00.38-00.56); "Kung Fu Fighting," by Carl Douglas (00.56-01.03); "Keep on Groovin'," by The Brady Bunch (01.03-01.17); "Greased Lightnin'," by John Travolta (01.17-01.28); "You Shook Me All Night Long," by AC/DC (01.28-01.42); "Billie Jean," by Michael Jackson (01.42-01.50); "Thriller," by Michael Jackson (01.50-01.58); "Oompa Loompa," by Willy Wonka, a soundtrack of the film: Willy Wonka & the Chocolate Factory (01.58-02.04); "Mr. Roboto," by Styx (02.04-02.14); "Break Dance (Electric Boogie)," by West Street Mob (02.14-02.28); "Walk Like An Egyptian," by The Bangles (02.28-02.36); "The Chicken Dance," by Bob Kames (02.36-02.42); "Mony Mony," by Billy Idol (02.42-02.57); "Ice Ice Baby," by Vanilla Ice (02.57-03.11); "U Can't Touch This," by MC Hammer (03.12-03.42); "Love Shack," by The B-52's (03.42-03.46); "Apache," by The Sugarhill Gang (03.46-04.02); "Jump Around," by House of Pain (04.02-04.15); "Baby Got Back," by Sir Mix-A-Lot (04.15-04.22); "Tubthumping," by Chumbawamba (04.22-04.32); "What Is Love," by Haddaway (04.32-04.40); "Cotton Eyed Joe," by Rednex (04.40-05.01); "Macarena," by Los Del Rio (05.01-

05.06); "Bye Bye Bye," by N'Sync (05.06-05.29); "Lose Yourself," by Eminem (05.29-05.33); "Hey Ya!," by Outkast (05.33-05.39); "Dirt Off Your Shoulder," by Jay-Z (05.39-05.49); "Ice Ice Baby," by Vanilla Ice (Lyrics played: "Yo, let's get outta here. Word to your mother".) (05.49-05.52); "Bye Bye Bye," by N'Sync (Lyrics played: "Bye, bye, bye".) (05.52-06.00).

Video "mash-ups" such as these are increasingly common among user-generated content posted to social networking websites.

How should a web site handle such content? Should it allow or forbid free distribution? Should it allow distribution with conditions, such as with some recompense to relevant copyright holders? Etc.

An exemplary embodiment of the present technology considers a plurality of factors and/or parameters in making an automated decision. Such considerations can include (by way of example and not limitation):

1. The Length of the Derived Portion.

The length can be, e.g., in absolute terms (e.g., 10 seconds), or in percentage of the pre-existing work (e.g., 10 seconds may comprise 20% of a 50 second video, or a tiny fraction of a two hour movie). Different procedures may be invoked, depending on the length. For example, if the entirety of a pre-existing work is used, then free distribution may be prohibited (and a notice may be electronically sent to the submitter explaining same), or the system may permit free distribution but share 75% of associated ad revenue with the copyright holder of the work. If two seconds or less is used, the system may permit free distribution. If between two and five seconds is used, the system may permit free distribution, but send a notice to the copyright holder alerting it to the use, and periodically alert the copyright holder to the content's popularity ranking on the site. If from five to ten seconds is used, and such portion comprises less than 10% of the entirety of a copyrighted work, the system may proceed as just-stated, with 10% of associated ad revenue shared with the copyright holder—unless copyright in the work is held by Company A, in which case no distribution is permitted (and a notification is sent to the submitter). If between ten and fifteen seconds is used, the system may proceed as just-stated but with a 15% ad revenue share, unless copyright in the work is held by one of several specified Japanese rights-holders, in which case no distribution is permitted. Etc. Etc.

2. The Part of the Pre-Existing Content from which the Portion is Derived.

For example, if the portion is taken from the first or last ten seconds, or from the first or last one percent of the content—whichever is smaller, any applicable ad-revenue share otherwise determined to be applicable may be increased by 25%. If the portion is taken from the chorus or title phrase of a song, any applicable ad-revenue share otherwise determined to be applicable may be increased by 33%.

3. An Identity of a Party Having Rights to the Pre-Existing Work.

If the portion is determined to have been authored by an agency of the US government (e.g., a government movie clip of President Reagan), then the system may determine that no restriction should arise by use of such clip—regardless of its length. If the portion is determined to have been derived from a copyrighted work owned by Company B, then the system may notify the Company if the content is sufficiently popular that it ranks among the 100 top videos downloaded from the site for any given day or week. If the portion is determined to have been derived from a copyrighted work owned by Company C, then the system may edit the content to remove that portion—if less than 5 seconds in length (possibly substituting a screen saying "Video omitted at request of Company C," or another message established by Company C or the web site, if the copyrighted work is visual), or, if longer, prohibit distribution of the content. If the portion is a video clip is determined to depict Individual D, who may enjoy a protectable right of publicity, then a notice may be dispatched to a last-known contact address for that person, and 10% of any associated ad revenue may be deposited into a reserve account to help fund possible claims against the web site operator. If watermark- or fingerprint-indexed metadata permits identification of actors depicted in a video clip, contract terms between the web site and the Screen Actors' Guild may specify, e.g., that each actor is entitled to 0.25 cents each time the content is downloaded. If the portion includes music in the licensing catalog of the Harry Fox agency, or ASCAP/BMI, a royalty payment of 0.1 cents for each ten seconds of music, up to a maximum of 0.4 cents, may be accrued for payment each time the content is downloaded.

4. An Identity of Another Party Affiliated with the Pre-Existing Work.

Sometimes parties in addition to rights-holders may be considered in determining treatment of content. One such party is the person from whom the content is uploaded. Other potentially relevant parties include those in the chain of content distribution that led to the content finally being uploaded to the web site. (Such chain may be determined, e.g., by watermark data added by various parties involved in the content's distribution.) Ten percent of associated ad revenue may be provided to the person who uploaded the content, and a further five percent may be distributed among earlier parties in the chain of distribution.

5. A Language of the Pre-Existing Work, or Other Language(s) Found in the Content.

Metadata can be consulted to determine the language of the portion, or same can be determined by machine recognition techniques. If the portion is in Japanese, and the content is downloaded to a user in the United States, any sharing of ad revenue otherwise owing may be reduced by 50%. If a Japanese language clip is included in a video mash-up that includes no other Japanese language content (e.g., the rest of the mash-up comprises Spanish or English language content), then any sharing of ad revenue otherwise owing may be increased by 25%.

6. A Country of Origin of the Pre-Existing Work.

If the portion is determined to have been copied from a television sitcom produced in the European Union, a copyright levy may be paid to the royalty collecting society in the work's country of origin. The amount of this levy can be fixed (e.g., a penny per download), or it can be a share of advertising revenue (with different share percentages for content downloaded into different countries). These amounts can naturally also depend on others of these listed factors.

7. Metadata Conveyed with the Portion, E.G., by Watermark Data, Header Data, Etc.

Such metadata may specify, for example, that unlimited distribution is permitted, provided written attribution is provided to a specified rights-holder. In such case, the system can overlay a text legend on the video portion saying "Video used courtesy of Party E." Such overlay can be accomplished on-the-fly, each time the content is downloaded. Or the content can be edited once to conform to the specified requirement, and stored in this edited fashion. The metadata may also specify terms of use with which the system can comply, e.g., this content can be used only if advertising is suppressed while the content is rendered. The metadata can also specify the amount and payee of required royalty payments. The system can make an automated assessment of such terms, and act accordingly. For example, the system may apply a threshold cost limit (e.g., 1.5 cents) and permit redistribution of the content only if the required royalty payment is beneath this threshold. The system may further take other factors into account. For example, if the portion is recognized to be from one of several items of content that are known to be popular on the site (e.g., historical download data may show that all clips from The Daily Show by Jon Stewart fall into this category), it can triple the threshold cost limit otherwise applied.

8. Metadata Conveyed Apart from the Portion, E.G., in a Database at the Web Site or at a Remote Location.

While metadata can be literally conveyed with content as noted above, it is often stored separately from the content, and indexed by an identifier derived from the content. The identifier may be derived by fingerprint technology (including, e.g., pattern matching), or by watermark decoding. The metadata may be stored in a database maintained by a party having rights to the content, or by a third party—including the web site operator. For example, a fingerprint-based identifier derived from content may serve as a pointer to a database record maintained by Hollywood content producer A. The web site may copy that metadata and minor it in a database kept locally with the site's web server. Digimarc operates commercial metadata services, ImageBridge and MyPictureMarc, which, when queried by watermark-decoded content identifiers, return associated metadata. Another metadata service is detailed in patent application Ser. No. 11/614,947 (now published as US20070208711). Other providers, such as Flickr, del.icio.us, and Google Video, likewise serve as metadata repositories for content. In addition to the use cases just-given (in connection with metadata conveyed with the portion), such metadata repositories can provide data relating to many of the other factors noted herein (e.g., identification of rights holders, language, terms of use, etc.).

(The metadata (e.g., from Flickr) may associate a Creative Commons license with the work. There are six main types of Creative Commons licenses. The most restrictive (while still allowing redistribution) is "Attribution Non-commercial No Derivatives," which permits others to share the work—unchanged and non-commercially, provided the user gives the creator credit and a link-back. Next is "Attribution Non-commercial Share Alike," which allows others to make derivative works non-commercially, provided they credit the creator, and such works licensed under the same terms. The "Attribution Non-commercial" license is similar, but without the requirement that derivative works be licensed on the same terms. "Attribution Share Alike" is similar, but allowing commercial uses (and requiring licensing on the same basis). "Attribution No Derivatives," forbids making derivative works, but allows redistribution in original form, with credit to the creator. Least restrictive is "Attribution (by)," which allows others to make derivative works and use commercially, as long as they credit the creator. Other, more specialized, licenses are also available, e.g., "Sampling Licenses" for re-use of snippets, "Public Domain Dedication" to free works from all copyright protection, "Music Sharing Licenses" for fan use, "Developing Nations License" with less restrictive terms in low income countries, etc. Each of these licenses has abbreviated descriptors, such as "by-nc" for the "Attribution Non-commercial" license. These and other terms-of-use type metadata can be used to govern automatically the manner in which content is treated by a web site.)

9. A Popularity Metric Associated with the Pre-Existing Work (or the Uploaded Content).

A clip from a Beatles song will often warrant a different treatment than a clip from an undiscovered garage band. Popularity of a pre-existing work can be determined in numerous ways. One is by reference to industry "Top" lists, such as those published by Billboard magazine (and available on the Billboard web site), etc. Another is by reference to popularity indices maintained by content vendors such as Amazon (the Amazon Sales Rank) and Apple/iTunes. Once content is identified, the system can assess its popularity by reference to one or more such data sources. If the popularity of the work exceeds a threshold (e.g., a ranking in the top 100 of any of Billboard's lists, or an Amazon Sales Rank of 500 or above), then treatment of such a portion can be different than that afforded portions derived from less popular works. For example, a fee may be charged to users who download the content. Or a portion of ad-related revenue may be provided to the copyright holder(s) of the constituent portions, or added to a reserve account to fund possible claims.

Similarly, the uploaded content's own popularity may influence its manner of treatment. For example, once a video breaks into YouTube's 100 Most Viewed videos of the day or week, it may merit different treatment than video that is rarely viewed. As noted in the preceding paragraph, a fee may be charged, or a portion of ad-related revenue may be earmarked. In one embodiment, the acts detailed herein are not invoked routinely, but are invoked only when the content breaks into a top echelon of popularity.

10. A Jurisdiction from which the Web Site is Hosted, or from which the Content was Uploaded, or to which the Content is to be Distributed.

A different per-download fee may be warranted if content is downloaded to Canada than Cuba. Similarly, different treatment may be appropriate based on the location from which the content originated, or even the physical location of the web site servers.

11. A Value Associated with the Pre-Existing Work.

Sometimes values can be associated with pre-existing works, e.g., by reference to the price of the work as distributed in CD/DVD form by Amazon. Beatles music is rarely discounted; grade B movies are often discounted. From such information, better-informed business decisions may be made about treatment of content.

12. Historical Information Concerning Related Content.

Sometimes a relationship can be inferred, or established, between uploaded content and content earlier handled by the web site. A new episode of The Daily Show by Jon Stewart may be recognized, by metadata association, to be related to earlier episodes. Information about the earlier episodes (e.g., how it was treated by the website; consumption data; etc.) can be retrieved and used to inform how the new episode should best be handled.

13. Data Relating to an Assessment of Said Content Provided by a Human Evaluator.

Sometimes part or all of the content may be referred to a human evaluator for assessment. The evaluator may, e.g., determine whether a pre-existing work identified by fingerprinting is a true match, or a false negative. The evaluator may also classify the content by genre, e.g., home video, amateur music video to commercial sound track, etc. In some cases, this assessment can be referred out to non-employees of the web site, e.g., by using crowdsourcing techniques like Amazon's Mechanical Turk service. (Such arrangements are detailed, e.g., in application US20070162761.) Such techniques can be employed to determine whether use of a pre-existing work has indicia of fair use (considering factors such as the purpose and character of the use, the nature of the copyrighted work, the amount and substantiality of the portion copied, and the effect of the use upon the potential market).

14. Factors, Like Those Above, Relating to One or More Other Portions of the Content, which have been Derived from Other Pre-Existing Works.

Content that borrows from dozens of pre-existing works (like the "Evolution of Dance" video noted above) may call for different treatment than content that is based on just a single pre-existing work. For example, any split of ad revenue will need to take into account the relatively large number of others works involved. If such a mash-up borrows exclusively from the catalog of one rights-holder, it might be regarded as helpful publicity for that catalog and therefor be entitled to move favorable usage terms than a mash-up that borrows from a variety of different catalogs.

It is expressly contemplated that systems incorporating the presently-described technology may employ rules that are dependent on more than one of the factors noted above. In some cases, some factors may be dependent on others. All such permutations and combinations are expressly encompassed by this specification.

The analysis of the content—and sometimes circumstance and context—to determine treatment can be undertaken by the web site system at the time content is uploaded to the site (e.g., at "ingest"). The system can seek to examine the uploaded content to try and identify all possible pre-existing works from which portions may have been derived, or it may only check against a limited number of pre-existing works (e.g., those works owned by predetermined parties). Alternatively, instead of performing these acts at ingest, the system can undertake these actions at a later time (e.g., after the content has demonstrated some user popularity—such as being downloaded 100 or 1000 times; or in response to a third party request—such as by a rights holder who notices an excerpt of copyrighted content hosted by the site). Certain of these acts can also be undertaken not by the web site operator, but by third parties (e.g., content owners), such as by automated web scripts that download content of interest, and assess same using the acts detailed above.

A sample system 100 in which the present technology can be practiced is illustrated in FIG. 1. A web site 10 includes a database 12, a CPU 14, a watermark decoder 16, a fingerprint algorithm 18, a memory 20, and local rules 22. (Not shown are the well known interfaces by which the web site receives uploaded content 24 from users, and dispatches downloaded content 26 to requesting users.)

CPU 14 can comprise one or many processors, as is typical in web server architectures. Memory 20 can comprise a large RAM array in which data and instructions (e.g., operating system, applications software, etc.) are loaded for use by the CPU. Database 12 is an organized data structure in which various data is stored for later retrieval. Examples include audio and video uploaded by users, cached content metadata previously retrieved from other sources, and may include local rules 22. Watermark decoder 16 examines content for steganographically-embedded (digitally watermarked) metadata, such as content identifiers or rights management data. Fingerprint algorithm 18 derives fingerprint data from content, to aid in its identification. (Decoder 16 and algorithm 18 may be implemented in hardware, but are more typically implemented using software loaded into memory 20 and executed on CPU 14.)

Local rules 22 can establish default behaviors of the system in different circumstances. Such rules may provide, for example, that: downloads exceeding 10 minutes should be made only to registered site users; shorter downloads can be made to unregistered users; no content should be downloaded to IP addresses associated with Country X; advertising—sourced from Google based on metadata keywords provided to Google by the site—should be displayed with the content; etc.

The content 24 uploaded from users (e.g., audio, video, games, imagery, etc.) may include metadata. This metadata can be "in-band" (e.g., steganographically embedded in audio or video data), or "out-of-band" (e.g., conveyed in file title, header fields, etc). It may be literally included, or a code or index pointer may be conveyed—by which corresponding metadata from a data repository can be retrieved. As noted, the metadata can include rules by which use of the content should be governed (e.g., a descriptor, such as "by-nc," which indicates that the terms of the Creative Commons "Attribution, Non-Commercial" license apply). The metadata can also include information that is used in applying rules (e.g., the identification of rights-holders, the language of the content, etc.).

(Content 26 downloaded to users can similarly include metadata. This metadata can be of various types, including usage rules, serialization data, credit card of purchaser, etc. In one particular arrangement, the content is steganographically encoded with keywords determined through processes like those detailed herein. For example, a video of a football game may be encoded with the term (or an index that corresponds to the term) "football." Such steganographically-encoded metadata can serve to trigger appropriate responses at the downloader's device, e.g., presenting an advertisement for Jeep products.)

When content 24 is processed (by system 100, or otherwise), the operation often starts by examining the content to identify same. As noted, both watermarking (steganography) and fingerprinting can be employed for this purpose. Watermarking is advantageous in that a watermarked work (or portion thereof) can be identified with a high degree of confidence. Fingerprinting, in contrast, compares characteristics of the content data against a database of reference data to try and make a best-guess as to the content's identity. Desirably, the identification operates with a relatively high degree of granularity (e.g., on the order of seconds for temporal media) to identify all components of which the content may be comprised.

Such identification techniques commonly make use of one or more accessory databases 28, 30 to resolve a watermark or fingerprint identifier (e.g., A75C20) into a more generally useful content identifier. Such content identifier can comprise, e.g., a textual description of the content, a alphanumeric identifier such as ISAN (International Standard Audiovisual Number), etc. In addition to the content identifier, the database 28/30 can also provide other metadata, including language, copyright holder, actor names, terms of use, and applicable rules.

The databases 28, 30 can be general purpose in scope (such as the MusicID database service offered by Gracenote), or may encompass the content catalog of only one or a few companies (e.g., a Hollywood studio may maintain a database relating to its specific offerings). Many television broadcasts are digitally watermarked with metadata identifying the broadcasting station and the time of broadcast, and a corresponding database may be queried by system 100 with these data to learn the identity of the marked content. (See, e.g., Nielsen's U.S. Pat. Nos. 7,117,513 and 6,647,548, and publication US20060171474). System 100 may consult several such databases in an attempt to identify, and collect metadata, about content.

While rule data can be gleaned from the content itself (e.g., via metadata), or determined by reference to the web site's own rules database 22, the system may also consult external sources of rules and related data, such as databases 32a and 32b. For example, a studio may provide a database in which rule information for particular content (e.g., indexed by an ISAN identifier) is stored. This allows the content proprietors to more quickly adapt terms to changing market conditions (e.g., in order to promote an upcoming movie sequel, the studio may temporarily relax rules relating to the original movie).

Also shown in FIG. 1 is a metadata database 34. Again, the depicted database may be one of many. Such databases can comprise, e.g., Flickr, Del.icio.us, CMDS (detailed in application US20070208711), etc., and can again provide both rules, and related data on which rule execution may be based.

The system 100 may also make reference to rules and/or data maintained by a licensing agency 36, such as BMI, ASCAP, Harry Fox. Data source 36 can also comprise a rights server associated with DRM systems, such as Microsoft's Rights Management Services, Windows Media Rights Manager, Windows Media DRM 10, etc. (Applicable rules may require the system 100 to obtain licenses for distribution of certain content.)

Metadata obtained from one data repository (e.g., an ISAN identifier obtained from a database in response to an index decoded from an audio watermark) can be used to query further metadata sources (e.g., a database that lists actors and publication data for a movie in response to an input ISAN query). Data from that second repository, in turn, can be used to find further data in third and additional data repositories—providing a large universe of metadata resources from which the system can draw. (Conversion of format, protocol, classification, and/or other parameters may be required when using the results from one database to query another; such arrangements are detailed, e.g., in publication US20040243567.) The metadata in each of these repositories can includes rule information, which may be aggregated and combined to accurately determine appropriate treatment of the content, in accordance with the various factors in this disclosure.

Once rules applicable to content 24 are determined, the system 100 can store data relating to same in database 12 for later reference—obviating the need to poll all the remote sources repeatedly. (Some rules may be based on information that changes over time; this information will periodically have to be updated.)

In the depicted system 100, the web site serves as a virtual hub—querying remote sources and having resulting information returned to the web site. Naturally, this is not critical. Other architectural arrangements (a few of which are indicated by dashed arrows) can be used—with information being exchanged between remote computers, without the web site always acting as intermediary.

Figure 2:
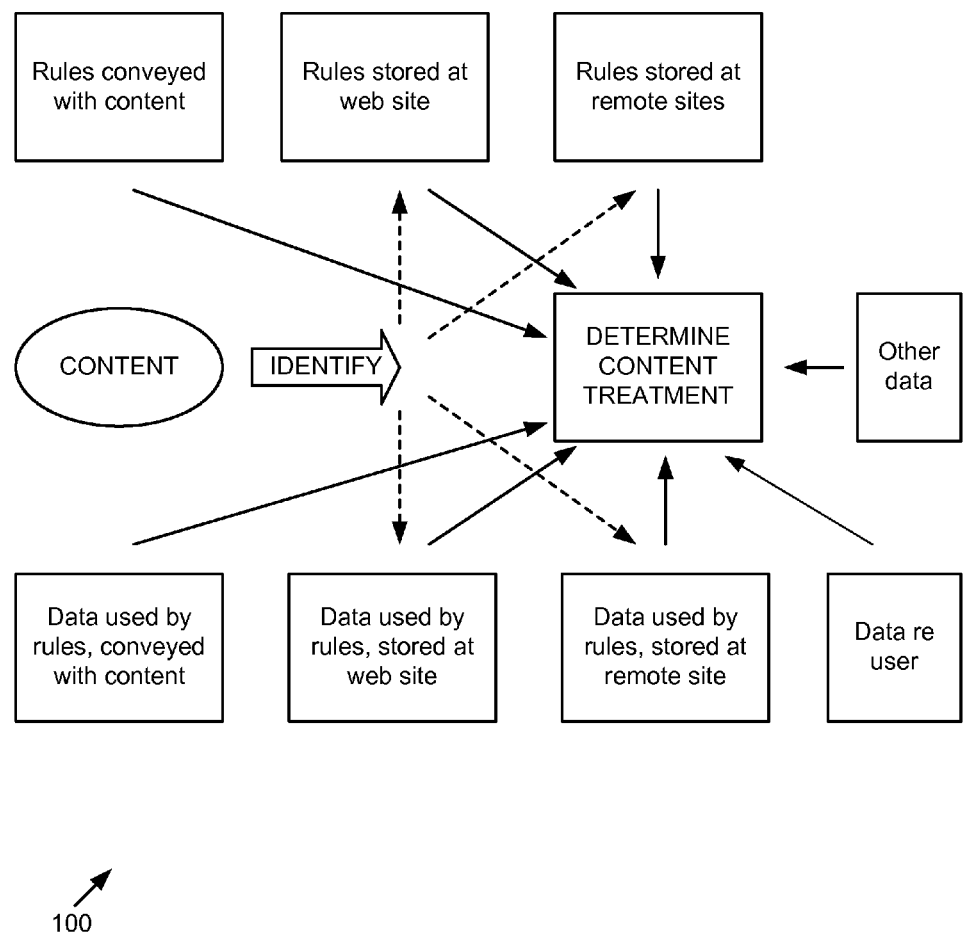
FIG. 2 shows some of the factors that may be considered in determining treatment of content.

FIG. 2 is a conceptual view of one particular implementation, in which content is identified, and corresponding rules and related information are then gathered from a variety of sources and applied in determining how the content should be treated. (The content treatment may also be a function of other data, such as the current date or time, and the identity or geographical location of the user who uploaded or requests download of the content.)

Figure 3:
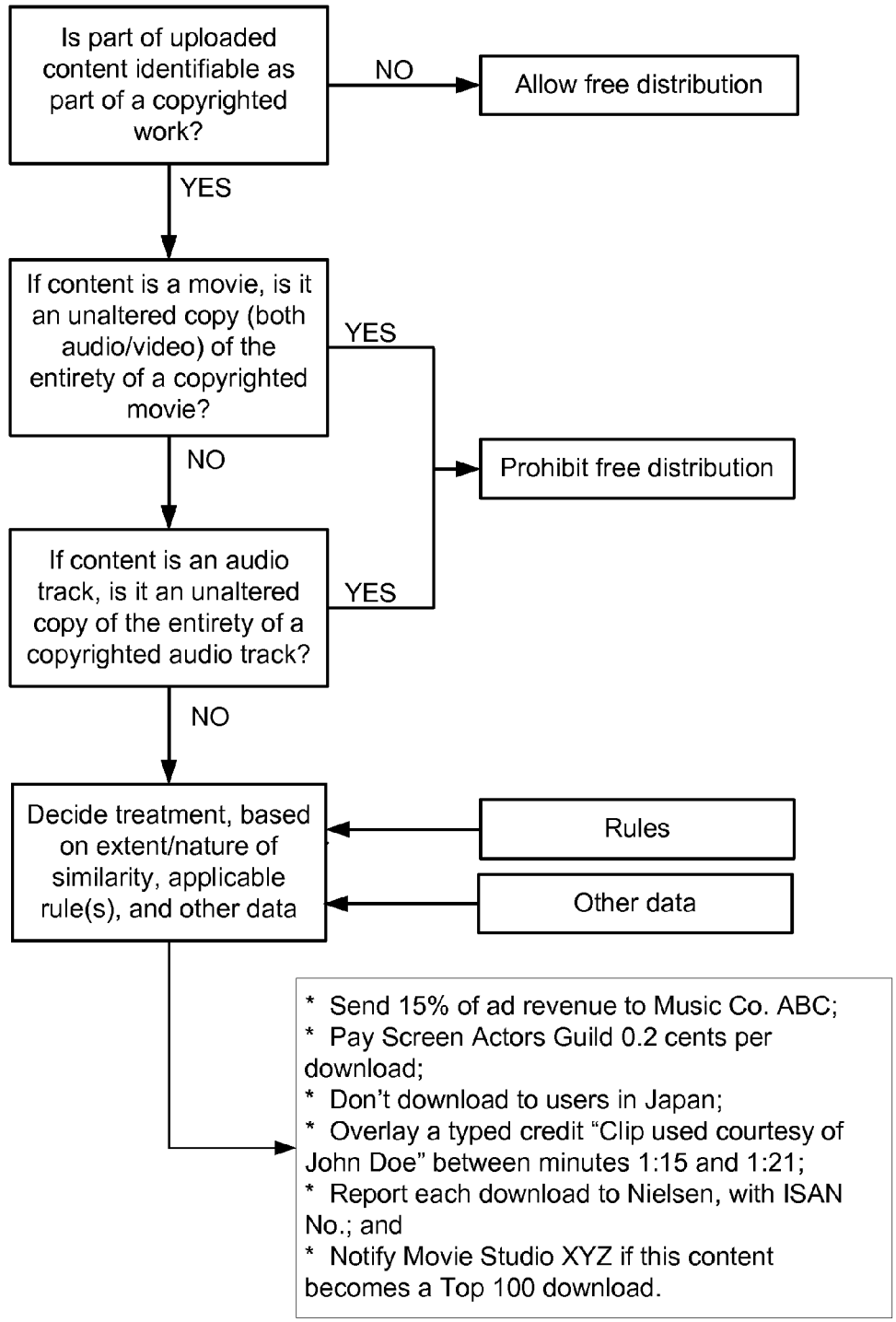
FIG. 3 is a flow diagram for an illustrative process.

FIG. 3 shows a sample process flow. In this arrangement, the content is first examined to determine if any part is identifiable as derived from a copyrighted work (e.g., by fingerprinting or watermark decoding). If no pre-existing work can be identified, then a rule allowing free distribution is invoked. If the content is a movie, and it is found to be an unaltered copy of the entirety of a copyrighted movie (i.e., with complete audio and video tracks), then a rule prohibiting free distribution is invoked. A similar rule is applied if the content is determined to be audio, and it is found to be an unaltered copy of the entirety of a copyrighted audio track. If neither of those conditions is met, the process applies rules that determine appropriate treatment, based on nature and extent of copying, and other data.

Another sample method examines uploaded content having both audio and video tracks. If the audio and video tracks are determined to be unaltered copies of respective audio and video portions of a pre-existing work, then the content is treated in a first manner (e.g., distribution is prohibited; or a fee is charged to downloading users, and 80% of the fee is paid to an associated rights-holder; etc). If the audio is determined to be an unaltered copy of the audio portion of a pre-existing work, but no such determination is made concerning the video, then perhaps the content is a home music video, with a person performing to a commercial music track. In this case the content is treated in a second manner, e.g., referred to a human evaluator to determine if the work might be regarded as a parody, and distribution thus permitted. If the video is determined to be an unaltered copy of the video portion of a pre-existing work, but the audio is different, then it might be a commercially valuable video, dubbed into a foreign language. In such circumstance the content may be treated in a third manner, such as prohibiting distribution, or referred to a human evaluator for assessment.

Having described and illustrated the principles of the technology with reference to specific implementations, it will be recognized that the technology can be implemented in many other, different, forms.

For example, while the arrangements described above employ fingerprinting or watermark decoding to determine content identity, this is not always needed. In some arrangements, for example, the content identity can be determined (or inferred) by other information, or by circumstance. Consider an uploaded file that includes an identifying ISAN number in a header field, together with a digital signature evidencing that the file has not been altered since being released by the authoring Hollywood studio. Or a file may be retrieved from the site by a remote web crawler or Perl script, in response to title keywords entered in a "Search" dialog box; results that match the entered title keywords may be inferred to include the searched-for content.

In some systems and methods, Bayesian techniques can be advantageously employed in help determine appropriate treatment for content objects and excerpts.

While the detailed arrangements particularly focused on treatment of content ingested by "user generated content" sites such as YouTube, MySpace and Flickr, the same principles are likewise applicable by any other system that receives or processes content (including, without limitation, network routers, firewalls, cell phones, set-top boxes, email servers and gateways, user computers, PDAs, blogging web sites, RSS servers and clients, indexing web crawlers and other web agents, peer-to-peer systems, video games, etc.).

It will be recognized that software instructions for programming a computer or processor in accordance with the teachings herein—as well as related data—can be stored on a computer-readable storage medium.

The rules employed in the detailed arrangements can be structured, stored, distributed, and applied in different ways. In addition to rules specific to particular content items, there may be rules specific to particular content creators, content owners, content hosts (e.g., YouTube vs. MySpace), etc.

Many implementations will make use of Web 2.0 technologies, e.g., employing standardized descriptors (XML and other semantically-valid tags, etc.), Ajax- or Flex-based UIs, folksonomies (collaborative tagging), content syndication, etc.

To provide a comprehensive disclosure without unduly lengthening this specification, applicant incorporates by reference each of the documents mentioned herein (for all of their respective teachings—not just the feature(s) mentioned).

The particular combinations of elements and features in the detailed embodiments are exemplary only; the interchanging, combination, and substitution of these teachings with other teachings in this and the incorporated-by-reference documents are expressly contemplated.

APPENDIX

Certain implementations of the technology make use of Amazon's Mechanical Turk service. Amazon's Mechanical Turk web site explains:

Amazon Mechanical Turk provides a web services API for computers to integrate Artificial Intelligence directly into their processing by making requests of humans. Developers use the Amazon Mechanical Turk web services API to submit tasks to the Amazon Mechanical Turk web site, approve completed tasks, and incorporate the answers into their software applications. To the application, the transaction looks very much like any remote procedure call—the application sends the request, and the service returns the results. In reality, a network of humans fuels this Artificial Intelligence by coming to the web site, searching for and completing tasks, and receiving payment for their work.

All software developers need to do is write normal code. The pseudo code below illustrates how simple this can be.

```
read (photo);
photoContainsHuman = callMechanicalTurk(photo);
if (photoContainsHuman == TRUE){
    acceptPhoto;
}
else {
    rejectPhoto;
}
```

More information about Amazon's Mechanical Turk service is provided in the Amazon Mechanical Turk Developer Guide, 2006, 165 pp., API Version Oct. 31, 2006 (attached as Appendix A to priority application Ser. No. 12/114,612).

The Mechanical Turk service may be regarded as a structured implementation of a technology commonly termed "crowdsourcing"—employing a group of outsiders to perform a task. Wikipedia explains:

"Crowdsourcing" is a neologism for a business model that depends on work being done outside the traditional company walls: while outsourcing is typically performed by lower paid professionals, crowdsourcing relies on a combination of volunteers and low-paid amateurs who use their spare time to create content, solve problems, or even do corporate R&D. The term was coined by *Wired* magazine writer Jeff Howe and editor Mark Robinson in June 2006.

Crowds targeted for crowdsourcing include garage scientists, amateur videographers, freelancers, photo enthusiasts, data companies, writers, smart mobs and the electronic herd.

Overview

While not a new idea, crowdsourcing is becoming mainstream. Open source projects are a form of crowdsourcing that has existed for years. People who may not know one another work together online to create complex software such as the Linux kernel, and the Firefox browser. In recent years internet technology has evolved to allow non-technical people to participate in online projects. Just as important, crowdsourcing presumes that a large number of enthusiasts can outperform a small group of experienced professionals.

Advantages

The main advantages of crowdsourcing is that innovative ideas can be explored at relatively little cost. Furthermore, it also helps reduce costs. For example if customers reject a particular design, it can easily be scrapped. Though disappointing, this is far less expensive than developing high volumes of a product that no one wants. Crowdsourcing is also related to terms like Collective Customer Commitment (CCC) and Mass Customisation. Collective Customer Commitment (CCC) involves integrating customers into innovation processes. It helps companies exploit a pool of talent and ideas and it also helps firms avoid product flops. Mass Customisation is somewhat similar to collective customer commitment; however, it also helps companies avoid making risky decisions about what components to prefabricate and thus avoids spending for products which may not be marketable later.

Types of Crowdsourced Work

Steve Jackson Games maintains a network of MIB (Men In Black), who perform secondary jobs (mostly product representation) in exchange for free product. They run publicly or semi-publicly announced play-tests of all their major books and game systems, in exchange for credit and product. They maintain an active user community online, and have done so since the days of BBSes.

Procter & Gamble employs more than 9000 scientists and researchers in corporate R&D and still have many problems they can't solve. They now post these on a website called InnoCentive, offering large cash rewards to more than 90,000 'solvers' who make up this network of backyard scientists. P&G also works with NineSigma, YourEncore and Yet2.

Amazon Mechanical Turk co-ordinates the use of human intelligence to perform tasks which computers are unable to do.

YRUHRN used Amazon Mechanical Turk and other means of crowdsourcing to compile content for a book published just 30 days after the project was started.

iStockphoto is a website with over 22,000 amateur photographers who upload and distribute stock photographs. Because it does not have the same margins as a professional outfit like Getty Images it is able to sell photos for a low price. It was recently purchased by Getty Images.

Cambrian House applies a crowdsourcing model to identify and develop profitable software ideas. Using a simple voting model, they attempt to find sticky software ideas that can be developed using a combination of internal and crowdsourced skills and effort.

A Swarm of Angels is a project to utilize a swarm of subscribers (Angels) to help fund, make, contribute, and distribute, a £1 million feature film using the Internet and all digital technologies. It aims to recruit earlier development community members with the right expertise into paid project members, film crew, and production staff.

The Goldcorp Challenge is an example of how a traditional company in the mining industry used a crowdsource to identify likely veins of gold on its Red Lake Property. It was won by Fractal Graphics and Taylor-Wall and Associates of Australia but more importantly identified 110 drilling targets, 50% of which were new to the company.

CafePress and Zazzle, customized products marketplaces for consumers to create apparel, posters, cards, stamps, and other products.

Marketocracy, to isolating top stock market investors around the world in head to head competition so they can run real mutual funds around these soon-to-be-discovered investment super-stars.

Threadless, an internet-based clothing retailer that sells t-shirts which have been designed by and rated by its users.

Public Insight Journalism, A project at American Public Media to cover the news by tapping the collective and specific intelligence of the public. Gets the newsroom beyond the usual sources, uncovers unexpected expertise, stories and new angles.

External Links and References

*The Rise of Crowdsourcing, Wired* June 2006.

*Crowdsourcing: Consumers as Creators, BusinessWeek* July 2006.

In accordance with certain embodiments of this technology, Amazon's Mechanical Turk system, or similar crowdsourcing arrangements, are employed to match a first item of visual or audio entertainment content to a counterpart in a universe of such items.

For example, consider a user social networking site such as YouTube (now Google) that distributes "user generated content" (e.g., video files), and employs fingerprinting to recognize media content that should not be distributed. The site may check a video file at the time of its uploading with a fingerprint recognition system (e.g., of the sort offered by Audible Magic, or Gracenote). If no clear match is identified, the video may be indexed and stored on YouTube's servers, available for public downloading. Meanwhile, the content can be queued for review by one or more crowdsource reviewers. They may recognize it as a clip from the old TV sitcom "I Love Lucy"—perhaps digitally rotated 3 degrees to avoid fingerprint detection. This tentative identification is returned to YouTube from the API call. YouTube can check the returning metadata against a title list of works that should not be distributed (e.g., per the request of copyright owners), and may discover that "I Love Lucy" clips should not be distributed. It can then remove the content from public distribution. Additionally, the fingerprint database can be updated with the fingerprint of the rotated version of the I Love Lucy clip, allowing it to be immediately recognized the next time it is encountered.

The foregoing and other examples, features and advantages of this technology will be more apparent from the following Detailed Description.

DETAILED DESCRIPTION

One use of the Mechanical Turk service (and similar crowdsourcing technologies) is in connection with computationally difficult tasks, such as identification of audio, video and imagery content. These tasks are sometimes addressed by so-called "fingerprint" technology, which seeks to generate a "robust hash" of content (e.g., distilling a digital file of the content down to perceptually relevant features), and then compare the thus-obtained fingerprint against a database of reference fingerprints computed from known pieces of content, to identify a "best" match. Such technology is detailed, e.g., in Haitsma, et al, "A Highly Robust Audio Fingerprinting System," Proc. Intl Conf on Music Information Retrieval, 2002; Cano et al, "A Review of Audio Fingerprinting," Journal of VLSI Signal Processing, 41, 271, 272, 2005; Kalker et al, "Robust Identification of Audio Using Watermarking and Fingerprinting," in Multimedia Security Handbook, CRC Press, 2005, and in patent documents WO02/065782, US20060075237, US20050259819, and US20050141707.

A related technology is facial recognition—matching an unknown face to a reference database of facial images. Again, each of the faces is distilled down to a characteristic set of features, and a match is sought between an unknown feature set, and feature sets corresponding to reference images. (The feature set may comprise eigenvectors or shape primitives.) Patent documents particularly concerned with such technology include US20020031253, U.S. Pat. No. 6,292,575, U.S. Pat. No. 6,301,370, U.S. Pat. No. 6,430,306, U.S. Pat. No. 6,466,695, and U.S. Pat. No. 6,563,950.

These are examples of technology that relies on "fuzzy" matching. The fingerprint derived from the unknown content often will not exactly match any of the reference fingerprints in the database. Thus, the database must be searched not just for the identical content fingerprint, but also for variants.

Expanding the search to include variants hugely complicates—and slows—the database search task. To make the search tractable, one approach is to prune the database—identifying excerpts thereof that are believed to be relatively likely to have a match, and limiting the search to those excerpts (or, similarly, identifying excerpts that are believed relatively unlikely to have a match, and not searching those excerpts).

The database search may locate several reference fingerprints that are similar to the fingerprint of the unknown content. The identification process then seeks to identify a "best" match, using various algorithms.

Such content identification systems can be improved by injecting a human into the process—by the Mechanical Turk service or similar systems.

In one particular arrangement, the content identification system makes an assessment of the results of its search, e.g., by a score. A score of 100 may correspond to a perfect match between the unknown fingerprint and a reference fingerprint. Lower scores may correspond to successively less correspondence. (At some lower score, $S_x$, (perhaps 60) the system may decide that there is no suitable match, and a "no-match" result is returned, with no identification made.)

Above some threshold score, $S_y$, (perhaps 70) the system may be sufficiently confident of the result that no human intervention is necessary. At scores below $S_y$, the system may make a call through the Mechanical Turk service for assistance.

The Mechanical Turk can be presented the unknown content (or an excerpt thereof), and some reference content, and asked to make a comparison. (The reference content may be stored in the fingerprint database, or may be readily obtainable through use of a link stored in the reference database.)

A single item of reference content can be provided for comparison with the unknown content, or several items of reference content can be provided. (Again, excerpts may be used instead of the complete content objects. Depending on the application, the content might be processed before sending to the crowdsource engine, e.g., removing metadata (such as personally identifiable information: name, driver license number, etc.) that is printed on, or conveyed with, the file.)

The requested comparison can take different forms. The service can be asked simply whether two items appear to match. Or it can be asked to identify the best of several possible matches (or indicate that none appears to match). Or it can be asked to give a relative match score (e.g., 0-100) between the unknown content and one or more items reference content.

In many embodiments, a query is referred to several different humans (e.g., 2-50) through the Mechanical Turk service, and the returned results are examined for consensus on a particular answer. In some queries (e.g., does Content A match Content B? Or is Content A a better match to Content C?), a "vote" may be taken. A threshold of consensus (e.g., 51%, 75%, 90%, 100%) may be required in order for the service response to be given weight in the final analysis. Likewise, in queries that ask the humans to provide a subjective score, the scores returned from plural such calls may be combined to yield a net result. (The high and/or low and/or outlier scores may be disregarded in computing the net result; weighting can sometimes be employed, as noted below.)

As suggested, the data returned from the Mechanical Turk calls may serve as a biasing factor, e.g., pushing an algorithmically determined output one way or another, to yield a final answer (e.g., a net score). Or the data returned from the Mechanical Turk calls may be treated as a definitive answer—with results from preceding processes disregarded.

Sometimes the database search may reveal several candidate matches, all with comparable scores (which may be above the threshold $S_y$). Again, one or more calls to the Mechanical Turk service may be invoked to decide which match is the best, from a subjective human standpoint.

Sometimes the Mechanical Turk service can be invoked even in situations where the original confidence score is below the threshold, $S_x$, which is normally taken as indicating "no match." Thus, the service can be employed to effectively reduce this threshold—continuing to search for potential matches when the rote database search does not yield any results that appear reliable.

The service can also be invoked to effect database pruning. For example, a database may be organized with several partitions (physical or logical), each containing information of a different class. In a facial recognition database, the data may be segregated by subject gender (i.e., male facial portraits, female facial portraits), and/or by age (15-40, 30-65, 55 and higher—data may sometimes be indexed in two or more classifications), etc. In an image database, the data may be segregated by topical classification (e.g., portrait, sports, news, landscape). In an audio database, the data may be segregated by type (spoken word, music, other). Each classification, in turn, can be further segregated (e.g., "music" may be divided into classical, country, rock, other). And these can be further segregated (e.g., "rock" may be classified by genre, such as soft rock, hard rock, Southern rock; by artist, e.g., Beatles, Rolling Stones, etc.).

A call to the Mechanical Turk can be made, passing the unknown content object (or an excerpt thereof) to a human reviewer, soliciting advice on classification. The human can indicate the apparent class to which the object belongs (e.g., is this a male or female face? Is this music classical, country, rock, or other?). Or, the human can indicate one or more classes to which the object does not belong.

With such human advice (which, again, may involve several human reviewers, with a voting or scoring arrangement), the system can focus the database search where a correct match—if any—is more likely to be found (or avoid searching in unproductive database excerpts). This focusing can be done at different times. In one scenario it is done after a rote search is completed, in which the search results yield matches below the desired confidence level of $S_y$. If the database search space is thereafter restricted by application of human judgment, the search can be conducted again in the limited search space. A more thorough search can be undertaken in the indicated subset(s) of the database. Since a smaller excerpt is being searched, a looser criteria for a "match" might be employed, since the likelihood of false-positive matches is diminished. Thus, for example, the desired confidence level $S_y$ might be reduced from 70 to 65. Or the threshold $S_x$ at which "no match" is concluded, may be reduced from 60 to 55. Alternatively, the focusing can be done before any rote searching is attempted.

The result of such a human-focused search may reveal one or more candidate matches. The Mechanical Turk service may be called a second time, to vet the candidate matches—in the manner discussed above. This is one of several cases in which it may be desirable to cascade Mechanical Turk calls—the subsequent calls benefiting from the former.

In the example just-given, the first Mechanical Turk call aids in pruning the database for subsequent search. The second call aids in assessing the results of that subsequent search. In other arrangements, Mechanical Turk calls of the same sort can be cascaded.

For example, the Mechanical Turk first may be called to identify audio as music/speech/other. A second call may identify music (identified per the first call) as classical/country/rock/other. A third call may identify rock (identified per the second call) as Beatles/Rolling Stones/etc. Here, again, by iterative calling of a crowdsourcing service, a subjective judgment can be made that would be very difficult to achieve otherwise.

In some arrangements, human reviewers are pre-qualified as knowledgeable in a specific domain (e.g., relatively expert in recognizing Beatles music). This qualification can be established by an online examination, which reviewers are invited to take to enable them to take on specific tasks (often at an increased rate of pay). Some queries may be routed only to individuals that are pre-qualified in a particular knowledge domain. In the cascaded example just given, for example, the third call might be routed to one or more users with demonstrated expertise with the Beatles (and, optionally, to one or more users with demonstrated expertise with the Rolling Stones, etc.). A positive identification of the unknown content as sounding like the Beatles would be given more relative weight if coming from a human qualified in this knowledge domain. (Such weighting may be taken into account when aggregating results from plural human reviewers. For example, consider an unknown audio clip sent to six reviewers, two with expertise in the Beatles, two with expertise in the Rolling Stones, and two with expertise in the Grateful Dead. Assume the Beatles experts identify it as Beatles music, the Rolling Stones experts identify it as Grateful Dead music, and the Grateful Dead experts identify it as Rolling Stones music. Despite the fact that there are tie votes, and despite the fact that no selection earned a majority of the votes, the content identification service that made these calls and is provided with these results may logically conclude that the music is Beatles.)

Calls to the Mechanical Turk service may request the human to provide metadata relevant to any content reviewed. This can include supposed artist(s), genre, title, subject, date, etc. This information (which may be ancillary to a main request, or may comprise the entirety of the request) can be entered into a database. For example, it can be entered into a fingerprint database—in association with the content reviewed by the human.

Desirably, data gleaned from Mechanical Turk calls are entered into the database, and employed to enrich its data— and enrich information that can be later mined from the database. For example, if unknown content X has a fingerprint $F_x$, and through the Mechanical Turk service it is determined that this content is a match to reference content Y, with fingerprint $F_y$, then a corresponding notation can be added to the database, so that a later query on fingerprint $F_x$ (or close variants thereof) will indicate a match to content Y. (E.g., a lookup table initially indexed with a hash of the fingerprint $F_x$ will point to the database record for content Y.)

Calls to outsourcing engines involve a time lag before results are returned. The calling system can generally cope, or be adapted to cope, with such lags.

Consider a user social networking site such as YouTube (now Google) that distributes "user generated content" (e.g., video files), and employs fingerprinting to recognize media content that should not be distributed. The site may check a video file at the time of its uploading with a fingerprint recognition system (e.g., of the sort offered by Audible Magic, or Gracenote). If no clear match is identified, the video may be indexed and stored on YouTube's servers, available for public downloading. Meanwhile, the content can be queued for review by one or more crowdsource reviewers. They may recognize it as a clip from the old TV sitcom "I Love Lucy"—perhaps digitally rotated 3 degrees to avoid fingerprint detection. This tentative identification is returned to YouTube from the API call. YouTube can check the returning metadata against a title list of works that should not be distributed (e.g., per the request of copyright owners), and may discover that "I Love Lucy" clips should not be distributed. It can then remove the content from public distribution. (This generally follows a double-check of the identification by a YouTube employee.) Additionally, the fingerprint database can be updated with the fingerprint of the rotated version of the I Love Lucy clip, allowing it to be immediately recognized the next time it is encountered.

If the content is already being delivered to a user at the moment the determination is made (i.e., the determination that the content should not be distributed publicly), then the delivery can be interrupted. An explanatory message can be provided to the user (e.g., a splash screen presented at the interruption point in the video).

Rotating a video by a few degrees is one of several hacks that can defeat fingerprint identification. (It is axiomatic that introduction of any new content protection technology draws hacker scrutiny. Familiar examples include attacks against Macrovision protection for VHS tapes, and against CSS protection for packaged DVD discs.) If fingerprinting is employed in content protection applications, such as in social networking sites (as outlined above) or peer-to-peer networks, its vulnerability to attack will eventually be determined and exploited.

Each fingerprinting algorithm has particular weaknesses that can be exploited by hackers to defeat same. An example will help illustrate.

A well-known fingerprinting algorithm operates by repeatedly analyzing the frequency content of a short excerpt of an audio track (e.g., 0.4 seconds). The method determines the relative energy of this excerpt within 33 narrow frequency bands that logarithmically span the range 300 Hz-2000 Hz. A corresponding 32-bit identifier is then generated from the resulting data. In particular, a frequency band corresponds to a data bit "1" if its energy level is larger than that of the band above, and a "0" if its energy level is lower. (A more complex arrangement can also take variations over time into account, outputting a "1" only if the immediately preceding excerpt also met the same test, i.e., having a band energy greater than the band above.)

Such a 32 bit identifier is computed every hundredth of a second or so, for the immediately preceding 0.4 second excerpt of the audio track, resulting in a large number of "fingerprints." This series of characteristic fingerprints can be stored in a database entry associated with the track, or only a subset may be stored (e.g., every fourth fingerprint).

When an unknown track is encountered, the same calculation process is repeated. The resulting set of data is then compared against data earlier stored in the database to try and identify a match. (As noted, various strategies can be employed to speed the search over a brute-force search technique, which yields unacceptable search times.)

While the just-described technique is designed for audio identification, a similar arrangement can be used for video. Instead of energies in audio subbands, the algorithm can use average luminances of blocks into which the image is divided as the key perceptual features. Again, a fingerprint can be defined by determining whether the luminance in each block is larger or smaller than the luminance of the preceding block.

While little has been written about attacks targeting fingerprinting systems, a casual examination of possible attack scenarios reveals several possibilities. A true hacker will probably see many more. Four simple approaches are discussed below.

Radio Loudness Profiling

The reader may be familiar with different loudness profiles selectable on car radios, e.g., Jazz, Talk, Rock, etc. Each applies a different frequency equalization profile to the audio, e.g., making bass notes louder if the Rock setting is selected, and quieter if the Talk setting is selected, etc. The difference is often quite audible when switching between different settings.

However, if the radio is simply turned on and tuned to different stations, the listener is generally unaware of which loudness profile is being employed. That is, without the ability to switch between different profiles, the frequency equalization imposed by a particular loudness profile is typically not noticed by a listener. The different loudness profiles, however, yield different fingerprints.

For example, in the Rock setting, the 300 Hz energy in a particular 0.4 second excerpt may be greater than the 318 Hz energy. However, in the Talk setting, the situation may be reversed. This change prompts a change in the leading bit of the fingerprint.

In practice, an attacker would probably apply loudness profiles more complex than those commonly available in car radios—increasing and decreasing the loudness at many different frequency bands (e.g., 32 different frequency bands). Significantly different fingerprints may thus be produced. Moreover, the loudness profile could change with time—further distancing the resulting fingerprint from the reference values stored in a database.

Multiband Compression

Another process readily available to attackers is audio multiband compression, a form of processing that is commonly employed by broadcasters to increase the apparent loudness of their signal (most especially commercials). Such tools operate by reducing the dynamic range of a soundtrack—increasing the loudness of quiet passages on a band-by-band basis, to thereby achieve a higher average signal level. Again, this processing of the audio changes its fingerprint, yet is generally not objectionable to the listeners.

Psychoacoustic Processing

The two examples given above are informal attacks—common signal processing techniques that yield, as side-effects, changes in audio fingerprints. Formal attacks—signal processing techniques that are optimized for purposes of changing fingerprints—are numerous.

Some formal attacks are based on psychoacoustic masking. This is the phenomena by which, e.g., a loud sound at one instant (e.g., a drum beat) obscures a listener's ability to perceive a quieter sound at a later instant. Or the phenomena by which a loud sound at one frequency (e.g., 338 Hz) obscures a listener's ability to perceive a quieter sound at a nearby frequency (e.g., 358 Hz) at the same instant. Research in this field goes back decades. (Modern watermarking software employs psychoacoustic masking in an advantageous way, to help hide extra data in audio and video content.)

Hacking software, of course, can likewise examine a song's characteristics and identify the psychoacoustic masking opportunities it presents. Such software can then automatically make slight alterations in the song's frequency components in a way that a listener won't be able to note, yet in a way that will produce a different series of characteristic fingerprints. The processed song will be audibly indistinguishable from the original, but will not "match" any series of fingerprints in the database.

Threshold Biasing

Another formal attack targets fingerprint bit determinations that are near a threshold, and slightly adjusts the signal to swing the outcome the other way. Consider an audio excerpt that has the following respective energy levels (on a scale of 0-99), in the frequency bands indicated:

| 300 Hz | 318 Hz | 338 Hz | 358 Hz |
|--------|--------|--------|--------|
| 69     | 71     | 70     | 68     |

The algorithm detailed above would generate a fingerprint of {011 . . . } from this data (i.e., 69 is less than 71, so the first bit is '0'; 71 is greater than 70, so the second bit is '1'; 70 is greater than 68, so the third bit is '1').

Seeing that the energy levels are somewhat close, an attacker tool could slightly adjust the signal's spectral composition, so that the relative energy levels are as follows:

| 300 Hz | 318 Hz | 338 Hz | 358 Hz |
|--------|--------|--------|--------|
| 70     | 69     | 70     | 68     |

Instead of {011 . . . }, the fingerprint is now {101 . . . }. Two of the three illustrated fingerprint bits have been changed. Yet the change to the audio excerpt is essentially inaudible.

Exploiting Database Pruning

Other fingerprint hacking vulnerabilities arise from shortcuts employed in the database searching strategy—seeking to prune large segments of the data from further searching. For example, the system outlined above confines the large potential search space by assuming that there exists a 32 bit excerpt of the unknown song fingerprint that exactly matches (or matches with only one bit error) a 32 bit excerpt of fingerprint data in the reference database. The system looks at successive 32 bit excerpts from the unknown song fingerprint, and identifies all database fingerprints that include an excerpt presenting a very close match (i.e., 0 or 1 errors). A list of candidate song fingerprints is thereby identified that can be further checked to determine if any meets the looser match criteria generally used. (To allow non-exact fingerprint matches, the system generally allows up to 2047 bit errors in every 8192 bit block of fingerprint data.)

The evident problem is: what if the correct "match" in the database has no 32 bit excerpt that corresponds—with just 1 or 0 bit errors—to a 32 bit excerpt from the unknown song? Such a correct match will never be found—it gets screened out at the outset.

A hacker familiar with the system's principles will see that everything hinges on the assumption that a 32 bit string of fingerprint data will identically match (or match with only one bit error) a corresponding string in the reference database. Since these 32 bits are based on the strengths of 32 narrow frequency bands between 300 Hz and 2000 Hz, the spectrum of the content can readily be tweaked to violate this assumption, forcing a false-negative error. (E.g., notching out two of these narrow bands will force four bits of every 32 to a known state: two will go to zero—since these bands are lower in amplitude than the preceding bands, and two will go to one—since the following bands are higher in amplitude that these preceding, notched, bands). On average, half of these forced bits will be "wrong" (compared to the untweaked music), leading to two bit errors—violating the assumption on which database pruning is based.)

Attacks like the foregoing require a bit of effort. However, once an attacker makes the effort, the resulting hack can be spread quickly and widely.

The exemplary fingerprinting technique noted above (which is understood to be the basis for Gracenote's commercial implementation, MusicID, built from technology licensed from Philips) is not unique in being vulnerable to various attacks. All fingerprinting techniques (including the recently announced MediaHedge, as well as CopySense and RepliCheck) are similarly believed to have vulnerabilities that can be exploited by hackers. (A quandary for potential adopters is that susceptibility of different techniques to different attacks has not been a focus of academic attention.)

It will be recognized that crowdsourcing can help mitigate the vulnerabilities and uncertainties that are inherent in fingerprinting systems. Despite a "no-match" returned from the fingerprint-based content identification system (based on its rote search of the database for a fingerprint that matches that of the altered content), the techniques detailed herein allow human judgment to take a "second look." Such techniques can identify content that has been altered to avoid its correct identification by fingerprint techniques. (Again, once such identification is made, corresponding information is desirably entered into the database to facilitate identification of the altered content next time.)

It will be recognized that the "crowdsourcing" methodologies detailed above also have applicability to other tasks involved in the arrangements detailed in this specification, including all the documents incorporated by reference.

Implementation of systems according to the present technology is straightforward to artisans, e.g., using standard computer-, database-, software- and network-technology.

To provide a comprehensive disclosure without unduly lengthening this specification, applicant incorporates-by-reference the documents referenced in this disclosure. In addition to those noted elsewhere, these incorporated documents include application Ser. No. 10/979,770 (now U.S. Pat. No. 7,314,162) and Ser. No. 11/132,724 (published as US20050288952); published applications US20030052768, US20030099379. US20030115459, US20030216988, US20040059953, US20040064415, US20040153663, US20040189441, US20040205030, US20040213437, US20040230527, US20040245330, US20050039057, US20050132235, US20050154924, and US20050171851, and issued U.S. Pat. Nos. 5,679,938, 5,679,940, 6,513,018, 6,597,775, 6,944,604, 6,965,889, and 6,968,328.

It is expressly contemplated that the technologies, features and analytical methods detailed herein can be incorporated into the methods/systems detailed in such other documents. Moreover, the technologies, features, and analytical methods detailed in those documents can be incorporated into the methods/systems detailed herein. (It will be recognized that the brief synopses of prior documents provided above naturally do not reflect all of the features found in such disclosures.)

In view of the wide variety of embodiments to which the principles and features discussed above can be applied, it should be apparent that the detailed embodiments are illustrative only and should not be taken as limiting the scope of the disclosed technology. Rather, we claim all such modifications as may come within the scope and spirit of the following claims and equivalents thereof.

The invention claimed is:

1. A computer-implemented method comprising:
providing an ingest server interface to receive visual or audio entertainment content uploaded to a first party's video service for distribution from the service to content viewers;
storing data associated with the uploaded content;
deriving with one or more configured electronic processors fingerprint data from the data associated with the uploaded content, in which said fingerprint data comprises one or more hash(es);
analyzing with one or more configured electronic processors the fingerprint data derived from the data associated with the uploaded content, and fingerprint data corresponding to reference content, to identify a portion of the uploaded content suspected as being derived from a work of reference content;
identifying stored rule data to govern treatment of the uploaded content, from among plural sets of stored rule data, said identifying being based on said work of reference content, or based on a proprietor of said work of reference content;
based on information determined by said analyzing, determining plural factors including: (a) a length of said portion of the uploaded content that was derived from said work of reference content, and (b) from what part of said work of reference content from a plurality of different parts of said work of reference content was said portion of the uploaded content derived, said determining yield determined plural factors; and then
determining an action to take concerning the uploaded content, based on said determined plural factors and also based on the identified stored rule data, in which the determined action also depends on a geographic location of a user that uploaded the content to the video service or that requested download of the content from the video service;
wherein the determined action comprises an action selected from the list: (i) notifying a proprietor of said work of reference content about the uploaded content, (ii) preventing the uploaded content from being distributed from the video service to content viewers, and (iii) sharing revenue generated from advertising presented to content viewers in connection with the uploaded content; and
implementing the determined action with one or more processors of a video distribution server.

2. The method of claim 1 in which determining a length of said portion comprises determining a length of said portion in time.

3. The method of claim 1 in which determining a length of said portion comprises determining a length of said portion as a fraction of the length of said work of reference content.

4. The method of claim 1 wherein:
in a first circumstance, the determined action comprises notifying a work of reference content proprietor about the uploaded content;
in a second circumstance, the determined action comprises preventing the uploaded content from being distributed from the video service to content viewers; and
in a third circumstance, the determined action comprises sharing, with a work of reference content proprietor, revenue generated from advertising presented to content viewers in connection with the uploaded content.

* * * * *